United States Patent [19]
Glicksman et al.

[11] 3,754,935

[45] Aug. 28, 1973

[54] FROZEN PUDDING COMPOSITIONS

[75] Inventors: Martin Glicksman, Valley Cottage; Bartley N. Wankier, White Plains; Jerry E. Silverman, Yonkers, all of N.Y.

[73] Assignee: General Foods Corporation, White Plains, N.Y.

[22] Filed: Jan. 14, 1971

[21] Appl. No.: 106,584

[52] U.S. Cl. ................................................. 99/139
[51] Int. Cl. ............................................... A23g 5/00
[58] Field of Search ....................... 99/139; 99/136

[56] References Cited
UNITED STATES PATENTS

| | | | |
|---|---|---|---|
| 3,369,910 | 2/1968 | Ganz et al. | 99/139 |
| 3,021,222 | 2/1962 | Kerr et al. | 99/139 |
| 2,901,355 | 8/1959 | Baugert et al. | 99/139 |
| 2,935,510 | 5/1960 | Wurzburg | 99/139 X |

*Primary Examiner*—A. Louis Monacell
*Assistant Examiner*—J. M. Hunter
*Attorney*—Thomas R. Savoie, Daniel J. Donovan and Bruno P. Struzzi

[57] ABSTRACT

A formulation for making frozen puddings, based on raw, unmodified tapioca starch, which can withstand several freeze-thaw cycles including cycles through the +15°F temperature area.

2 Claims, No Drawings

FROZEN PUDDING COMPOSITIONS

BACKGROUND OF THE INVENTION

This invention relates to a novel frozen pudding composition. More particularly the invention relates to a frozen pudding having improved freeze-thaw cycling stability and formulated without the presence of chemically modified starches.

In recent years pudding compositions requiring little or no preparation by the consumer have become available. These puddings have been sold and distributed as sterilized canned products, refrigerated products or frozen products; however, all of these puddings have had certain disadvantages. Thus with canned puddings, sterilization and canning are required, and unused portions of pudding left in the can by the consumer are not adapted to be stored in a refrigerator for an extended period of time. With refrigerated puddings their shelf life in refrigerated storage compartments is limited.

Frozen puddings have offered a number of advantages including convenience and their ability to be stored at freezer temperatures for long periods of time without spoilage. However, many frozen puddings have failed to retain quality in freezer and refrigerator storage and exhibit syneresis and other textural changes.

There are currently available frozen puddings which exhibit reasonably good freeze-thaw stability due to the use of chemically modified starches such as those cross-linked starches described in C.F.R. 121.1031. Frozen puddings of this type have been described in a commonly assigned co-pending application, Ser. No. 822,022, filed May 5, 1969 now U.S. Pat. No. 3,669,687. It has been found, however, that even these puddings are susceptible to textural changes thought to be due in part to rupturing of the starch granules, when the puddings are either held at or cycled through a temperature of about +15°F. If this +15°F temperature could be avoided, textural changes would be much less of a problem.

Unfortunately, cycling through this +15°F temperature has been found to occur quite frequently during the distribution and storage of the frozen puddings in commercial freezer units. For reasons not at this time fully understood, each time the puddings pass through the specific temperature of about +15°F the occurrence of textural changes such as syneresis is more and more likely.

An additional concern with these prior art puddings is that the use of the chemically modified starches is subject to strict governmental control as well as incurring the criticism of many consumers who question the use of chemically modified food materials.

Thus it would be desirable to produce frozen pudding compositions which have improved resistance to syneresis during cycling through the +15°F temperature and which are free from chemically modified starch materials.

SUMMARY OF THE INVENTION

It has been found according to this invention that, among the known natural starch materials, tapioca starch is unique in that it is possible to produce frozen puddings having exceptionally good freeze-thaw stability including cycling through the +15° temperature range, and which puddings contain as their sole thickener or gelling agent chemically unmodified tapioca starch.

It is an object of this invention to produce a frozen pudding composition which can withstand several freeze-thaw cycles including cycling through the temperature of +15°F.

It is an additional object of this invention to produce such a freeze-thaw stable pudding which contains only natural thickening agents.

It is a further object of this invention to produce a frozen pudding wherein the sole thickening agent is chemically unmodified tapioca starch.

These and other objects will become apparent from a reading of the description herein.

DESCRIPTION OF THE INVENTION

Broadly this invention comprises a frozen pudding composition which is resistant to syneresis and other textural changes when subjected to several freeze-thaw cycles through the difficult temperature of +15°F, and which composition comprises chemically unmodified tapioca starch, carbohydrate sweetening agents, fat emulsion, flavor and color agents, milk solids and water.

Tapioca starch has proven to be the only natural starch which is suitable for use in the frozen puddings of this invention. Many other raw starches including other high amylopectin starches have been evaluated in identical pudding environments, and in each instance noticeable syneresis and severe textural changes occurred after just a few freeze-thaw cycles through a temperature of +15°F. The chemically unmodified starches which were found to be unsatisfactory for use in the frozen pudding compositions of this invention are: potato, arrow root, corn, rice, wheat, waxy maize, sorghum and waxy sorghum.

Sweetening agents which may be included in the frozen pudding composition include sucrose, dextrose, fructose, dextrins and similar carbohydrate. Low calorie puddings may also be prepared by employing synthetic sweetening agents preferably in combination with a carbohydrate filler.

Fat emulsions are usually incorporated in the pudding composition to improve the textural quality and mouthfeel of the pudding. The fat emulsion usually contains a vegetable fat and one or more emulsifying agents and is added directly to the pudding composition during the preparation of the pudding product.

Typical compositions for the frozen puddings of this invention may be defined by the following percent weight ranges:

| | |
|---|---|
| Water | 45 to 70 |
| Carbohydrates | 10 to 20 |
| Vegetable Fat | 3 to 12 |
| Milk Solids | 3 to 12 |
| Chemically Unmodified Tapioca Starch | 3 to 10 |
| Emulsifiers | 0.1 to 1.0 |
| Flavor/Color | as desired |

The invention is further described but not limited to the following example:

Example

| | (grams) |
|---|---|
| Water | 1985 |
| Sucrose | 432 |
| Hydrogenated Vegetable Oil (Wecotop A) | 195 |
| Non-Fat Milk Solids | 183 |
| Tapioca Starch, Raw | 180 |
| Sodium Stearyl Lactylate (emulsifier) | 12 |
| Dextrose | 9 |
| Sodium Caseinate | 9 |

| | |
|---|---|
| Salt | 6 |
| Polyoxyethylene Sorbitan Monostearate (emulsifier) | 7.2 |
| Flavor, Vanilla Extract | 12.0 |
| Color, Vanilla | 0.6 |

The pudding is prepared by melting all the fat and emulsifiers together in a water bath. The rest of the dry ingredients are then dispersed in water, the vanilla extract is added and the water mixture is brought to a full boil. The boiling water mixture is poured into a Waring Blender and blended at a low speed. The melted fat phase is then slowly added and blended until uniformly mixed. The mixture is then homogenized in an Eppenbach Colloid Mill for 5 minutes and poured into plastic containers. The pudding composition was then thoroughly frozen and subjected to nine freeze-thaw cycles with each cycle ranging from below +15°F to +75°F. No syneresis or other textural breakdowns were found to occur in any of the pudding samples prepared in accordance with this example.

Other raw starches (e.g. potato, arrow root, corn, rice, wheat, waxy maize, sorghum and waxy sorghum) were used as substitutes for the raw tapioca starch and pudding were prepared and processed as set forth in the example. In each instance noticeable syneresis and other textural breakdown were found to occur after only two or three of the freeze-thaw cycles.

Having thus described the invention what is claimed is:

1. A frozen pudding composition capable of withstanding several freeze-thaw cycles including cycles through +15°F comprising on a weight basis, water 45 percent to 70 percent, carbohydrate sweetening agents 10 percent to 20 percent, vegetable fat 3 percent to 12 percent, milk solids 3 percent to 12 percent, emulsifier 0.1 percent to 1 percent and thickening agent 3 percent to 10 percent, wherein the thickening agent consists essentially of chemically unmodified tapioca starch.

2. The composition of claim 1 wherein the vegetable fat is a hydrogenated vegetable oil.

* * * * *